United States Patent
Tortelli et al.

(10) Patent No.: US 6,828,388 B2
(45) Date of Patent: Dec. 7, 2004

(54) AMORPHOUS (PER) FLUORINATED POLYMERS

(75) Inventors: Vito Tortelli, Milan (IT); Pierangelo Calini, Milan (IT)

(73) Assignee: Solvay Solexis S.p.A., Milan (IT)

( * ) Notice: Subject to any disclaimer, the term of this patent is extended or adjusted under 35 U.S.C. 154(b) by 61 days.

(21) Appl. No.: 10/136,424

(22) Filed: May 2, 2002

(65) Prior Publication Data

US 2002/0183459 A1 Dec. 5, 2002

(30) Foreign Application Priority Data

May 7, 2001 (IT) ..................... MI2001A0921

(51) Int. Cl.$^7$ ................................. C08F 8/14
(52) U.S. Cl. ................... 525/326.4; 525/356
(58) Field of Search .............. 525/326.4, 356

(56) References Cited

U.S. PATENT DOCUMENTS

| | | | |
|---|---|---|---|
| 4,743,658 A | 5/1988 | Imbalzano et al. | 525/326.4 |
| 4,789,717 A | 12/1988 | Giannetti et al. | 526/209 |
| 4,864,006 A | 9/1989 | Giannetti et al. | 526/209 |
| 4,966,435 A | 10/1990 | Matsumoto et al. | 350/96.34 |
| 5,498,682 A | 3/1996 | Navarrini et al. | 526/247 |
| 5,883,177 A | 3/1999 | Colaianna et al. | 524/462 |
| 6,111,062 A * | 8/2000 | Shirota et al. | 528/402 |
| 2002/0128411 A1 * | 9/2002 | Navarrini et al. | 526/227 |

FOREIGN PATENT DOCUMENTS

| | | |
|---|---|---|
| EP | 0 220 910 A2 | 5/1987 |
| EP | 0 302 513 A1 | 2/1989 |
| EP | 0 375 178 A2 | 6/1990 |
| EP | 0 645 406 A1 | 3/1995 |
| EP | 0 918 060 A1 | 5/1999 |
| EP | 0 969 025 A1 | 1/2000 |
| EP | 0 919 060 B1 | 5/2000 |
| WO | WO 89/12240 | 12/1989 |

OTHER PUBLICATIONS

Pianca, M. et al., "End Groups in Fluoropolymers", J. Fluorine Chemistry; 1999; 95; pp. 71–84

P.M. Korinek "Amorphous Fluoropolymers—A New Generation of Product", Macromolecular Symposia, vol. 82, May 1994, pp. 61–65.

* cited by examiner

Primary Examiner—Bernard Lipman
(74) Attorney, Agent, or Firm—Arent Fox

(57) ABSTRACT

Amorphous perfluorinated or fluorinated polymers containing an amount lower than 0.05 mmoles/kg polymer of each of the following ionic end groups: COF, COOH, their esters or salts, when the used determination method for said end groups is the Fourier Transform IR spectroscopy by Nicolet® Nexus FT-IR equipment (256 scannings, resolution 2 cm$^{-1}$)

27 Claims, No Drawings

AMORPHOUS (PER) FLUORINATED POLYMERS

The present invention relates to amorphous perfluorinated or fluorinated polymers substantially unstable ionic end group free, in particular COF, COOH or their corresponding esters, or salts or said end groups being undetectable by the method reported hereunder.

More specifically the present invention relates to amorphous (per)fluorinated polymers containing cyclic perfluorinated structures.

Said polymers are characterized by a high transparency at wave lengths from 150 to 250 nm. Therefore said polymers are usable for achieving protective films in the production of semiconductors by means of microlithographic techniques at 248 nm, 193 nm and 157 nm.

It is known that amorphous fluorinated polymers when used for microlithographic applications must show the lowest possible absorption with respect to the wave lengths of the incident light. In this application fluoropolymers are required having transparency at lower and lower wave lengths, from 248 nm to 193 nm and preferably even to 157 nm, to have smaller and smaller and quicker and quicker chips.

The amorphous fluorinated polymers are characterized by a high transparency in a wide range of wave lengths, however at wave lengths lower than 250 nm the transparency is not high. This is mainly due to the fact that the amorphous polymers, obtained by the known conventional syntheses of the prior art, contain unstable polar ionic end groups, mainly of the COF, COOH type, which absorb at wave lengths lower than 250 nm, reducing the film transparency of the amorphous (per)fluorinated polymer to said wave length ranges.

Various processes to decrease or neutralize the residual amounts of said polar end groups are known in the prior art, however the known methods do not allow to lead to a substantial elimination of ionic end groups, in particular the COF and COOH end groups.

One of the methods used to neutralize the acid end groups in polymers is by fluorination: the fluorinating agent is generally elementary fluorine, but also other fluorinating agents are used.

The polymer can be fluorinated under solid form as described in U.S. Pat. No. 4,743,658, or dissolved in solvents which are stable to fluorination, as described in EP 919,060. Both treatments are carried out at high temperatures, particularly of the order of 200° C., with fluorine diluted with inert gas. Or, before fluorination a pre-treatment of the end groups can be carried out with tertiary amines or alcohols to favour the subsequent fluorination reaction. The temperatures are in the range 75° C.–200° C. and must be lower than the polymer Tg. See patent application WO 89/12,240 and U.S. Pat. No. 4,966,435.

By said methods of the prior art a reduction of the polar end groups is obtained but not their substantially complete elimination. Besides, in some cases during the process other polar end groups such as for example COF are formed. See the comparative Examples.

The residual presence of polar end groups in amorphous (per) fluorinated polymers, as said, worsens their optical properties and compromises the use thereof in the microlithography field, in particular at wave lengths lower than 200 nm, more particularly lower than 180 nm.

The Applicant has unexpectedly and surprisingly found perfluorinated or fluorinated amorphous polymers substantially unstable ionic end group free, in particular COF, COOH, or their esters, or salts, on the basis of the analysis method reported hereunder. An object of the present invention are amorphous perfluorinated or fluorinated polymers substantially unstable ionic end group free, in particular COF, COOH or their esters or salts, said end groups being undetectable by the method reported below, i.e. each end group being in a total amount lower than 0.05 mmoles/Kg polymer; the determination method of acid end groups being the Fourier transform IR spectroscopy by Nicolet® Nexus FT-IR equipment (256 scannings, resolution 2 $cm^{-1}$), wherein on a sintered polymer powder pellet having a 5 mm diameter and thickness from 50 to 300 microns (1.75–10.5 mg of polymer) a scanning between 4,000 $cm^{-1}$ and 400 $cm^{-1}$ is initially carried out, the pellet being then kept for 12 hours in an environment saturated with ammonia vapours, and finally recording the IR spectrum under the same conditions of the initial IR spectrum; elaborating the two spectra by subtracting from the signals of the spectrum relating to the untreated sample (initial spectrum) the corresponding ones of the specimen spectrum after exposure to ammonia vapours, obtaining the udifferencen spectrum, which is normalized by the following equation:

$$\frac{\text{"Difference spectrum"}}{[\text{pellet weight (g)/pellet area (cm}^2)]}$$

The optical densities related to the end groups which have reacted with the ammonia vapours are determined; said end groups being the COOH and COF end groups, that with ammonia vapours give rise to detectable peaks; the optical densities are converted in mmoles/kg polymer using the extinction coefficients reported in Table 1, page 73 of the paper by M. Pianca et Al. "End groups in fluoropolymers", J. Fluorine Chem. 95 (1999), 71–84 (herein incorporated by reference); the found values express the concentrations of the residual polar end groups as mmoles of polar end groups/kg of polymer: in the spectrum of the amorphous (per)fluorinated polymers bands related to COOH groups (3,600–3,500, 1,820–1,770 $cm^{-1}$) and/or COF groups (1,900–1,830 $cm^{-1}$) are not detectable, the method detectability limit being 0.05 mmoles/Kg polymer.

More particularly the present invention relates to amorphous (per) fluorinated polymers containing cyclic perfluorinated structures.

With amorphous polymers according to the present invention, besides the properly said amorphous polymers, also semicrystalline polymers are meant, provided that they are soluble in perfluorinated solvents for at least 1% by weight at temperatures in the range 0° C.–100° C., preferably 20° C.–50° C. The completely amorphous polymers show only glass transition temperatures but not melting temperatures; semicrystalline polymers show one glass transition temperature and melting temperatures.

As perfluorinated solvents, perfluoroalkanes, perfluoropolyethers, preferably having boiling point lower than 200° C., such as for example Galden® LS165, tertiary perfluoroamines, etc., can for example be mentioned.

The amorphous polymers according to the present invention contain one or more of the following fluorinated comonomers:

$C_2$–$C_8$ perfluoroolefins, such as tetrafluoroethylene (TFE) hexafluoropropene (HFP);

$C_2$–$C_8$ chloro-fluoroolefins, such as chlorotrifluoroethylene (CTFE);

$CF_2$=$CFOR_f$ (per)fluoroalkylvinylethers (PAVE), wherein $R_f$ is a $C_1$–$C_6$ (per)fluoroalkyl, for example $CF_3$, $C_2F_5$, $C_3F_7$;

CF$_2$=CFOX (per)fluoro-oxyalkylvinylethers, wherein X is: a C$_1$-C$_{12}$ alkyl, or a C$_1$-C$_{12}$ oxyalkyl, or a C$_1$-C$_{12}$ (per) fluoro-oxyalkyl having one or more ether groups, for example perfluoro-2-propoxy-propyl;

fluorosulphonic monomers, preferably selected from the following:

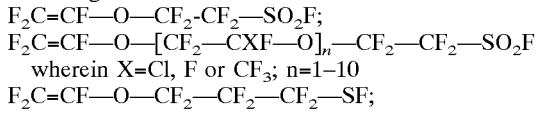

wherein X=Cl, F or CF$_3$; n=1–10

F$_2$C=CF—O—CF$_2$—CF$_2$—CF$_2$—SF;

fluorodioxoles, preferably perfluorodioxoles;

non conjugated dienes of the type:

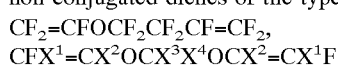

wherein X$^1$ and X$^2$, equal to or different from each other, are F, Cl or H; X$^3$ and X$^4$, equal to or different from each other, are F or CF$_3$, which during the polymerization cyclopolymerize.

Among fluorodioxoles the ones of formula:

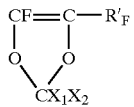

(IA)

can be mentioned, wherein R'$_F$ is equal to F, R$_F$ or OR$_F$ wherein R$_F$ is a linear or branched when possible perfluoroalkyl radical having 1–5 carbon atoms; X$_1$ and X$_2$ eual to or different from each other being F or CF$_3$.

Preferably in formula (IA) R'$_F$=OR$_F$, R$_F$ preferably is CF$_3$; X$_1$=X$_2$=F, and the compound is herein indicated as TTD.

When cyclic monomers or monomers which in polymerization generate cyclic structures are present, the amount of said monomers generally ranges from 15 to 100% by moles; preferably from 25% to 100%.

When the cyclic monomer is TTD, the amount % by moles in the polymer ranges from 40 to 95%.

The comonomers which can be copolymerized with cyclic monomers or which cyclize in polymerization are selected from one or more of the following: TFE, chlorotrifluoroethylene (CTFE), hexafluoropropene (HFP), perfluoroalkylvinylethers or perfluorooxyalkylvinylethers as above defined.

The preferred copolymers according to the present invention are the copolymers of TTD with tetrafluoroethylene, the other comonomers when present are generally in amounts ranging from 0% by moles to 20% by moles, preferably lower than 10% by moles.

The TTD dioxoles and the respective homopolymers and copolymers according to the present invention are prepared for example according to U.S. Pat. No. 5,498,682 and U.S. Pat. 5,883,177.

Other amorphous polymers which can be used according to the present invention not containing cyclic structures are based on TFE and HFP, optionally containing perfluorovinylethers as above defined, preferably perfluoromethylvinylether (PMVE), perfluoroethylvinylether (PEVE), perfluoropropylvinylether (PPVE).

The amorphous polymers of the present invention can be prepared according to polymerization methods in emulsion, preferably in microemulsion, in suspension or in bulk according to known methods of the prior art. In particular the amorphous polymers of the present invention can be prepared by copolymerization of monomers in aqueous emulsion, according to known methods of the prior art, in the presence of radical initiators, for example persulphates, perphosphates, alkaline or ammonium perborates or percarbonates, optionally in combination with ferrous, cuprous or silver salts, or of other easily oxidizable metals. In the reaction medium also surfactants of various type are usually present, among which fluorinated surfactants are particularly preferred. The polymerization reaction is generally carried out at temperatures in the range 25°–150° C., under pressure up to 10 MPa. The preparation is preferably carried out in microemulsion of (per) fluoropolyoxyalkylenes, according to U.S. Pat. No. 4,789, 717 and U.S. Pat. No. 4,864,006. Optionally in polymerization also well known chain transfer agents of the prior art can be used.

A further object of the present invention is a process for preparing the amorphous (per)fluorinated polymers of the present invention, containing reduced amounts or substantially ionic end group free as above defined, by treatment with elementary fluorine, optionally in admixture with inert gases, in a solvent inert to fluorination, in the presence of ultraviolet radiations having wave length from 200 to 500 nm, operating at temperatures lower than 100° C.

The used radiation has a wave length ranging from 200 to 500 nm, emitted for example from a mercury lamp Hanau TQ 150.

The reaction temperature preferably ranges from 0° C. to +100° C., preferably from +20° C. to +50° C.

Preferably the polymer concentration in the perfluorinated solvent is in the range 1–11% by weight.

At the end of the fluorination the solvent can be recovered by distillation and suitably reused.

As said, the determination of the acid end groups before and after the fluorination is carried out by IR spectroscopy, performing a scanning between 4,000 cm$^{-1}$ and 400 cm$^{-1}$, on a sintered polymer powder pellet which can have a thickness from 50 to 300 micron. The fluorination process ends when by IR spectroscopy bands relating to COOH groups (3,600–3,500, 1,820–1,770 cm$^{-1}$) and/or COF groups (1,900–1,830 cm$^{-1}$) are no longer detectable. The method detectability limit is 0.05 mmoles/Kg polymer.

As said, the polymers of the invention are characterized by a high transparency in a wide range of wave lengths, in particular from 150 to 250 nm. Therefore said polymers are usable for achieving transparent protective films in the semiconductor production by microlithographic techniques in the above wave length range and in particular at 248 nm, 193 nm and 157 nm.

The protective films are applied by casting, spin coating or other conventional methods.

The following Examples illustrate the invention and do not limit the scope thereof.

EXAMPLES

Determination of the Ionic End Groups by IR Spectroscopy

A small amount of the specimen (3.5 mg) is put under a press (3.5 ton/cm$^2$) and a pellet having a 5 mm diameter and 100 microns thickness is prepared.

The spectrum from 4,000 to 400 cm$^{-1}$ is recorded by Nicolet® Nexus FT-IR equipment (256 scannings, resolution 2 cm$^{-1}$).

The pellet is transferred in an environment saturated with ammonia vapours. After 12 hours the specimen is taken from the ammonia saturated environment and the IR spectrum is recorded again under the same conditions.

By subtracting from the signals of the spectrum relating to the specimen as such the corresponding ones of the specimen spectrum after exposure to ammonia vapours, the "difference" spectrum is obtained, which is normalized by the following equation:

$$\frac{\text{"Difference spectrum"}}{[\text{pellet weight (g)/pellet area (cm}^2)]}$$

The optical densities related to the end groups which have reacted with the ammonia vapours are determined. They are generally COOH or COF groups. The optical densities are transformed into mmoles/kg polymer using the extinction coefficients-reported in Table 1, page 73 of the paper by M. Pianca et Al. "End groups in fluoropolymers", J. Fluorine Chem. 95 (1999), 71–84. The found values express the concentrations of the residual polar end groups as mmoles of polar end groups/kg of polymer.

Example 1 (Comparative)

General Fluorination Process of End Groups at Room Temperature in Absence of UV Radiation and Solvent 14 g of amorphous TFE-TTD copolymer, TFE/TTD ratio 41/59 moles, prepared according to Example 2 of U.S. Pat. No. 5,883,177 and dried in nitrogen flow (1 Nl/h) for one hour at 100° C., are introduced in a 50 ml glass reactor, equipped with porous septum for the gas inlet. This polymer had an initial content of COOH end groups of 6.1 mmoles/Kg.

Then a mixture 1:1 by moles of nitrogen/fluorine (1 Nl/h) is fed at 25° C. for one hour, then pure fluorine (1 Nl/h) for 25 h. At the end of the reaction nitrogen is fed to wash the reactor (0.5 h), then a polymer specimen is analyzed by IR.

At the end of the fluorination the residual COOH end groups are in an amount of 1 mmole/Kg and the COF ones of 3.9 mmoles/Kg.

Example 2 (Comparative)

General Fluorination Process of End Groups at 80° C. in Absence of UV Radiation and Solvent Example 1 is repeated except that pure fluorine is fed for 10 hours into the reactor maintained at 80° C.

At the end of the fluorination the residual COOH end groups are in an amount of 1.1 mmoles/Kg and the COF end groups of 3.3 mmoles/Kg.

Example 3 (Comparative)

General Fluorination Process of End Groups at 100° C. in Absence of UV Radiation and Solvent Example 1 is repeated except that pure fluorine is fed for 10 hours in the reactor maintained at 100° C.

At the end of the fluorination the residual COOH end groups are in an amount of 0.6 mmoles/Kg and the COF end groups of 4.3 mmoles/Kg.

Example 4 (Comparative)

Fluorination Process of the End Groups at 25° C. in Absence of UV Radiation, Wherein a Solvent is Used 2 g of the copolymer of Example 1 and 40 ml of Galden® LS165 (perfluoropolyether having boiling point 165° C.) are fed into a 100 ml Monel reactor. The autoclave is brought to reduced pressure and it is brought again to atmospheric pressure with nitrogen. The step is repeated a second time. After having reduced the pressure again in the reactor, pure fluorine is fed until reaching 0.3 MPa.

The autoclave is left under stirring at 25° C. for 30 hours.

The fluorine in excess and the solvent are removed at reduced pressure.

At the end of the fluorination the residual COOH end groups are in an amount of 1.1 mmoles/Kg and the formed COF end groups of 0.9 mmoles/Kg.

Example 5 (Comparative)

Fluorination Process of the end Groups According to Example 4 of EP 918,060

90 g of a solution at 6% by weight of the copolymer used in Example 4 in perfluorotributylamine solvent are fed into a 100 ml Monel reactor. The autoclave is brought to reduced pressure and then to atmospheric pressure with nitrogen. The step is repeated a second time. After having reduced the pressure again in the reactor, a 5:1 mixture by volume nitrogen/fluorine is fed until reaching the pressure of 0.7 MPa.

The autoclave is kept under stirring at 195° C. for 10 hours.

The fluorine in excess and the solvent are removed at reduced pressure.

At the end of the fluorination the residual COOH end groups are in an amount of 1.4 mmoles/Kg and the COF end groups of 2.5 mmoles/Kg.

Example 6

Fluorination Process of the End Groups in the Presence of UV Light and Solvent 420 g of solution at 6% by weight of copolymer used in comparative Example 1 in perfluorinated solvent Galden® D100 (perfluoropolyether having b.p. 100° C.) are fed into a 300 ml photochemical glass reactor equipped with mechanical stirrer and mercury vapour UV immersion lamp (Hanau TQ 150). Nitrogen is fed into the solution for 1 h to remove the present oxygen, then a mixture 1:1 by volume of nitrogen/fluorine is fed in the presence of the UV radiations for 30 h at 25° C. After reaction the residual fluorine and the solvent are removed using a reduced pressure.

The total amount of residual end groups results lower than the method sensitivity limit, and therefore it is lower than 0.05 mmoles/Kg polymer.

Example 7

Preparation of Copolymer TFE/TTD 60/40

2790 ml of demineralized water, 6.67 g/litre $H_2O$ of microemulsion prepared as described in U.S. Pat. No. 4,864,006 are introduced in sequence in a 5 l AISI 316 autoclave, equipped with stirrer working at 650 rpm, after vacuum has been made by oil pump. The autoclave is heated up to 75° C. and at this temperature 33.3 g/liter $H_2O$ of TTD are added. The pressure inside the autoclave is brought to 1.4 MPa by TFE gas, subsequently 210 cc of a solution 0.0925 M of potassium persulphate are introduced. After about 10 minutes the reaction starts. The reaction pressure is maintained constant by feeding in a semicontinuous way, at each decrease of the inner pressure of 0.05 MPa, liquid TTD and gaseous TFE in the ratio by weight TTD/TFE=1.4. The reaction is stopped after having fed in all about 320 g of TTD. The latex is degassed and it has a 15% by weight concentration of solid. It is then coagulated with HNO₃ at 65% w/w, separated from the aqueous phase, washed twice with demineralized water and dried in stove at 85° C. for 100 h.

The polymer Tg is about 90° C. The polymer is therefore amorphous. At the IR analysis the polymer results to contain a residual amount of polar COOH groups of 12 mmoles/kg.

Example 7A

Fluorination Process of the End Groups in the Presence of UV Light and Solvent Under the same experimental conditions and operating procedures used in Example 6, the TFE/TTD copolymer of Example 7, dissolved at 5.6% by weight concentration in Galden® LS165, is fluorinated.

After 34 hours of fluorination, by the above method by IR spectroscopy it is verified that there are no longer detectable peaks of COOH and COF end groups.

Example 8

Preparation Copolymer CTFE/TTD 75/25

3,300 ml of demineralized water, 24 g of microemulsion prepared according to U.S. Pat. No. 4,864,006 and 490 g of TTD are introduced in sequence in a 5 l autoclave in Hastelloy C, equipped with stirrer at 650 rpm, after vacuum has been made by oil pump. The reactor is heated to 75° C. and brought to the pressure of 1.4 MPa by gaseous CTFE. Then 30 ml of a solution 23 g/liter of potassium persulphate in water are introduced. The internal pressure is maintained constant by additions of CTFE when the internal pressure decreases of 0.025 MPa. Contemporaneously 0.5 g of TTD are fed for each gram of CTFE reacted in the polymerization. At the 4th and 8th hour of reaction 15 ml aliquots of the initiator solution are introduced into the autoclave. After about 11 hours the reaction is stopped evacuating the reactor from the reacting gaseous mixture: a latex containing 17% by weight of solid is discharged. The latex is coagulated by cooling at −20° C., treatment with HNO₃ 65% by weight. After recovery from the aqueous phase it is washed twice with demineralized water and dried in stove at 90° C. for 48 h. The copolymer has a Tg of 104° C. and therefore it is amporphous. The amount of COOH end groups is 7.0 mmoles/kg.

Example 8A

Fluorination Process of End Groups in the Presence of UV Light and Solvent

Under the same experimental conditions and operating procedures used in Example 6 the CTFE/TTD copolymer of Example 8 is fluorinated, dissolved in solution at 4% by weight in solvent Galden® D100.

After 29 hours of fluorination, by the above method by IR spectroscopy, it is verified that there are no longer detectable peaks of the COOH and COF end groups.

Example 9

Fluorination Process of End Groups in the Presence of UV Light and Solvent

Under the same experimental conditions and operating procedures used in Example 6, the TFE/TTD 22/78 copolymer, prepared according to Example 5 of U.S. Pat. No. 5,883,177, is fluorinated, dissolved in solution at 5% by weight in Galden® D100. The polymer has an initial content of COOH end groups of 7.0 mmoles/kg.

After 13 hours of fluorination, by IR analysis, 1 mmole/kg polymer of residual COOH end groups and 1.4 mmoles/kg polymer of COF end groups which have formed are still found.

After 29 hours of fluorination, by IR analysis, peaks attributable to COOH and COF end groups are not detectable.

Example 10 (Comparative)

Fluorination in Solution at 2300C, in Absence of UV Light 90 g of a solution at 1.3% by weight of the copolymer used in Example 4, dissolved in solvent Galden® D100, are fed into a 100 ml Monel reactor. The autoclave is brought to reduced pressure and then the atmospheric pressure is restored with nitrogen. The step is repeated a second time. After having reduced the pressure again, a 1:1 mixture by volume nitrogen/fluorine is fed into the reactor until reaching a pressure value of 1.9 MPa.

The autoclave is kept under stirring at 230° C. for 12 hours.

At the end the fluorine in excess and the solvent are removed at reduced pressure.

The polymer residual COOH end groups are in an amount of 4.9 mmoles/Kg and the formed COF end groups of 11 mmoles/Kg.

Example 11 (Comparative)

Fluorination Process of the End Groups in the Presence of UV Light, in Absence of Solvent 14 g of the copolymer used in Example 1 are transferred in a 20 cc quartz phial. Nitrogen is fed into the reactor for 1 h to remove the present oxygen, then pure fluorine is fed (1.3 Nl/h) in the presence of the UV radiations, emitted from a lamp placed outside the reactor, for 25 h at 20° C. After reaction the residual fluorine and the solvent are removed at reduced pressure.

At the end of the fluorination the residual COOH end groups are in an amount of 1.6 mmoles/Kg and the COF ones of 2.4 mmoles/Kg.

Example 12

Determination of the Transmittance by UV Spectroscopy

A solution of the copolymer used in Example 9 but at a 10% by weight concentration, having an initial content of COOH end groups of 7.0 mmoles/kg, is filtered by a 0.2 microns porous septum and transformed in a film by casting, obtaining a film having a 20 microns thickness.

The film transmittance is determined in the range from 800 to 200 nm by a UV-Visibile Perkin Elmer Lambda 2 spectrometer.

The transmittance value at 200 nm is 79.3%. Another film specimen is prepared, having the same thickness as the previous one, by using the same technique, utilizing the partially fluorinated copolymer (fluorination time 13 hours) of Example 9. The film transmittance at 200 nm is equal to 89%.

The analysis repeated on the exhaustively fluorinated copolymer specimen of Example 9 gives a transmittance >95%.

What is claimed is:

1. Amorphous perfluorinated or fluorinated polymers containing an amount lower than 0.05 mmoles/kg polymer of each of the following ionic end groups: COF, COOH their esters or salts, when the used determination method for said end groups is the Fourier Transform IR spectroscopy by Nicolet® Nexus FT-IR equipment (256 scannings, resolution 2 cm$^{-1}$), wherein on a sintered polymer powder pellet having a 5 mm diameter and thickness from 50 to 300 microns, a scanning between 4,000 cm$^{-1}$ and 400 cm$^{-1}$ is initially carried out, then maintaining the pellet for 12 hours in an environment saturated with ammonia vapours; and finally recording the IR spectrum under the same conditions of the initial IR spectrum; elaborating the two spectra by subtracting from the signals of the spectrum relating to the untreated sample (initial spectrum) the corresponding ones of the specimen spectrum after exposure to ammonia vapours, obtaining the "difference" spectrum, which is normalized by the following equation:

$$\frac{\text{"Difference spectrum"}}{[\text{pellet weight (g)/pellet area (cm}^2)]}$$

measuring the optical densities related to the end groups which have reacted with the ammonia vapours, converting then the optical densities in mmoles/kg polymer using the following extinction coefficients where appropriate:

the group COOH at a frequency 3557 cm$^{-1}$ (OH stretching) has an extinction coefficient of 165 l.mol$^{-1}$.cm$^{-1}$: the same group COOH at a freauencv 1813 and 1775 cm$^{-1}$ (CO stretching): has an extinction coefficient of respectively 230 and 1700 l.mol$^{-1}$.cm$^{-1}$: the group COF at a frequency 1884 cm$^{-1}$ (CO stretching) has an extinction coefficient of 215 l.mol$^{-1}$.cm$^{-1}$; the group CONH$_2$ at a frequency 3555 cm$^{-1}$ and 3438 cm$^{-1}$ (NH$_2$ resoectively asymmetric and symmetric stretching) has an identical extinction coefficient of 220 l.mol$^{-1}$.cm$^{-1}$; the group CONH$_2$ at a frequency 1587 cm$^{-1}$ (NH$_2$ deformation motion) has an extinction coefficient of 220 l.mol$^{-1}$.cm$^{-1}$; and the group CONH$_2$ at a frequency 1768 cm$^{-1}$ (CO stretching) has an extinction coefficient 940 l.mol$^{-1}$.cm$^{-1}$.

2. Amorphous perfluorinated or fluorinated polymers according to claim 1, containing cyclic perfluorinated structures.

3. Perfluorinated or fluorinated polymers according to claim 1, wherein the amorphous polymers are soluble in perfluorinated solvents for at least 1% by weight at temperatures in the range 0° C.–100° C.

4. Semicrystalline perfluorinated or fluorinated polymers according to claim 3, wherein the perfluorinated solvents are selected from the group comprising perfluoroalkanes, perfluoropolyethers, preferably having boiling point lower than 20000, tertiary perfluoroamines.

5. Perfluorinated or fluorinated polymers according to claim 1, containing one or more of the following fluorinated comonomers:

$C_2$–$C_8$ perfluoroolefins;

$C_2$–$C_8$ chloro-fluoroolefins;

$CF_2=CFOR_f$ perfluoroalkylvinylethers or fluoroalkylvinylethers, wherein $R_f$ is a $C_1$–$C_6$ perfluoroalkyl or fluoroalkyl.

$CF_2=CFOX$ perfluoro-oxyalkylvinylethers or fluoro-oxyalkylvinylethers, wherein X is selected from the group consisting of following $C_1$–$C_{12}$ alkyl, $C_1$–$C_{12}$ oxyalkyl, and $C_1$–$C_{12}$ perfluoro-oxyalkyl or fluoro-oxyalkyl having one or more ether groups;

fluorosulphonic monomers, fluorodioxoles;

non conjugated dienes selected from the group consisting of $CF_2=CFOCF_2CF_2CF=CF_2$ and $CFX^1=CX^2OCX^3X^4OCX^2=CX^1F$, wherein $X^1$ and $X^2$, equal to or different from each other, are F, Cl or H;

$X^3$ and $X^4$, equal to or different from each other, are F or $CF_3$.

6. Perfluorinated or fluorinated polymers according to claim 5, wherein the fluorodioxoles have the formula:

(IA)

wherein R'$_F$ is equal to F, R$_F$ or OR$_F$ wherein R$_F$ is a linear or branched when possible perfluoroalkyl radical having 1–5 carbon atoms; X$_1$ and X$_2$ equal to or different from each other being F or CF$_3$.

7. Perfluorinated or fluorinated polymers according to claim 6, wherein in the formula (IA) R'$_F$=OR$_F$, X$_1$=X$_2$=F.

8. Perfluorinated or fluorinated polymers according to claim 2, wherein the amount of cyclic monomers or monomers which in polymerization generate cyclic structures ranges from 15 to 100% by moles.

9. Perfluorinated or fluorinated polymers according to claim 8, wherein the cyclic monomer has the formula:

(IA)

wherein R'$_F$ is equal to OR$_F$ wherein R$_F$ is a linear or branched when possible perfluoroalkyl radical having 1–5 carbon atoms; X$_1$=X$_2$=F and the comonomer is tetrafluoroethylene.

10. Perfluorinated or fluorinated polymers according to claim 9, wherein the amount % by moles of the cyclic monomer ranges from 40 to 95%.

11. Perfluorinated or fluorinated polymers according to claim 2, wherein the comonomers copolymerizable with cyclic monomers or which cyclize in polymerization are selected from the group consisting of tetrafluoroethylene (TFE) chlorotrifluoroethylene (CTFE), hexafluoropropene (HFP), perfluoroalkylvinylethers and perfluorooxyalkylvinylethers.

12. Perfluorinated or fluorinated polymers according to claim 1, comprising the dioxole having the formula:

(IA)

wherein R'$_F$ is equal to OR$_F$ wherein R$_F$ is a linear or branched when possible pernuoroalkyl radical having 1–5 carbon atoms; $X_1=X_2=F$, tetrafluoroethylene or other comonomers in amounts % by moles in the range 0%–20%.

13. Perfluorinated or fluorinated polymers according to claim 1, wherein the perfluofinated or fluorinated polymers are based on TFE and HFP, optionally containing perfluoroalkylvinylethers (PAVE).

14. A process for preparing amorphous (per) fluorinated polymers of claim 1, by treatment with elementary fluorine, optionally in admixture with inert gases, in a solvent inert to fluorination, in the presence of ultraviolet radiations having wave length from 200 to 500 nm, operating at temperatures lower than 100° C.

15. A process according to claim 14, wherein the used radiation has a wave length ranging from 200 to 500 nm.

16. A process according to claim 14, wherein the reaction temperature ranges from 0° C. to +100° C., preferably from +20° C. to +50° C.

17. A process according to claim 14, wherein the polymer concentration in the perfluorinated solvent is in the range 1–11% by weight.

18. A orocess for preparing transparent protective films, comprising applying microlithographic techniques on the polymers according to claim 1.

19. A orocess according to claim 18, wherein the protective films prepared are transparent in a wave lenath ranging from 150 to 250 nm.

20. Perfluorinated or fluorinated polymers according to claim 5, wherein the $C_2$–$C_8$ perfluoroolefins are tetrafluoroethylene (TFE) or hexafluoropropene (HFP);

the $C_2$–$C_8$ chloro-fluoroalefins are chlorotrifluoroethylene (CTFE);

$R_f$ is $CF_3$, $C_2F_5$ or $C_3F_7$;

the $C_1$–$C_{12}$ perfluoro-oxyalkyl or fluoro-oxyalkyl having one or more ether groups is perfluoro-2-propoxypropyl;

the fluorosulphonic monomers are:

$F_2C=CF$—$O$-$CF_2$—$CF_2$—$SO_2F$, $F_2C=CF$—$O$—$[CF_2$—$CXF$—$O]_n$—$CF_2$—$CF_2$—$SO_2F$ wherein $X=Cl$, F or $CF_3$; n=1–10, or $F_2CCF$—$O$-$CF_2$—$CF_2$—$CF_2$—$SO_2F$; and the fluorodioxoles are pernuorodioxoles.

21. Perfiuorinated or fluorinated polymers according to claim 7, wherein in the formula (IA) $R'_F$ is $CF_3$.

22. Perfluorinated or fluorinated polymers according to claim 8, wherein the amount of cyclic monomers or monomers which in polymerization generate cyclic structures ranges from 25% to 100% by moles.

23. Perfluorinated or fluorinated polymers according to claim 9, wherein $R_F$ is $CF_3$.

24. Perfluonnated or fluorinated polymers according to claim 12, wherein $R_F$ is $CF_3$.

25. Perfluorinated or fluorinated polymers according to claim 12, wherein $X_1=X_2=F$, tetrafluoroethylene or other comonomers in amounts lower than 10% by moles.

26. Perfiuorinated or fluorinated polymers according to claim 13, wherein the perfluoroalkylvinylethers (PAVE) are perfiuoromethylvinylether (PMVE), perfluoroethylvinylether (PEVE) or perfluoropropylvinylether (PPVE).

27. Perfluorinated or fluorinated polymers according to claim 3, wherein the amorphous polymers are soluble in perfluorinated solvents for at least 1% by weight at temperatures in the range of 20° C–50° C.

\* \* \* \* \*

UNITED STATES PATENT AND TRADEMARK OFFICE
CERTIFICATE OF CORRECTION

PATENT NO. : 6,828,388 B2
DATED : December 7, 2004
INVENTOR(S) : Vito Tortelli et al.

It is certified that error appears in the above-identified patent and that said Letters Patent is hereby corrected as shown below:

Column 9,
Line 57, delete "20000" and substitute therefor -- 200°C --.

Column 11,
Lines 21 and 24, delete "orocess" and substitute therefor -- process --; and
Line 25, delete "lenath" and substitute therefor -- length --.

Column 12,
Line 8, delete "$F_2CCF-O-CF_2-CF_2-CF_2-SO_2F;$" and substitute therefor
-- $F_2C=CF-O-CF_2-CF_2-CF_2-SO_2F$ --.

Signed and Sealed this

Thirty-first Day of May, 2005

JON W. DUDAS
*Director of the United States Patent and Trademark Office*